US006528583B1

(12) United States Patent
Chen et al.

(10) Patent No.: US 6,528,583 B1
(45) Date of Patent: Mar. 4, 2003

(54) THERMOPLASTIC MOLDING COMPOSITION HAVING IMPROVED DIMENSIONAL STABILITY AND LOW GLOSS

(75) Inventors: Chuan-Ju Chen, Amherst, MA (US); Marc E. Gage, Feeding Hills, MA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/538,648

(22) Filed: Mar. 30, 2000

(51) Int. Cl.[7] ............................................. C08L 51/04
(52) U.S. Cl. ............................................. 525/71; 83/85
(58) Field of Search ........................... 525/193, 71, 83, 525/85

(56) References Cited

U.S. PATENT DOCUMENTS

| | | |
|---|---|---|
| 3,055,859 A | 9/1962 | Vollmert |
| 3,670,052 A | 6/1972 | Saito et al. |
| 3,691,260 A | 9/1972 | Mittnacht et al. |
| 4,224,419 A | 9/1980 | Swoboda et al. ............. 525/71 |
| 4,778,850 A | 10/1988 | Lindner et al. ............... 525/80 |
| 4,902,744 A | 2/1990 | Lindner et al. ............... 525/71 |
| 5,157,076 A | 10/1992 | Greenlee et al. ............... 525/83 |
| 5,270,387 A * | 12/1993 | Sheilds et al. ................. 525/71 |
| 5,274,031 A | 12/1993 | Eichenauer et al. ........... 525/64 |
| 5,780,549 A * | 7/1998 | Ludwig ........................ 525/84 |
| 5,932,655 A | 8/1999 | Auclair et al. ................. 525/71 |
| 6,111,012 A * | 8/2000 | Fischer et al. ................. 525/64 |

FOREIGN PATENT DOCUMENTS

| | | |
|---|---|---|
| DE | 1260135 | 2/1968 |
| DE | 31 35 667 | 3/1983 |
| EP | 0 534 212 | 3/1993 |
| EP | 892015 | 1/1999 |

\* cited by examiner

Primary Examiner—Jeffrey Mullis
(74) Attorney, Agent, or Firm—Joseph C. Gil; Aron Preis

(57) ABSTRACT

A thermoplastic molding composition which features improved dimensional stability and low gloss is disclosed. The composition which contains (A) a first grafted rubber having a weight average particle size of 0.05 to 0.30 microns, (B) a second grafted rubber having a weight average particle size of 0.31 to 1.00 microns, (C) vinyl chloride (co) polymer, and, optionally, (D) styrene copolymer, is especially suitable for extruding profiles. In a preferred embodiment, at least one of the grafted rubbers is characterized in that its substrate features a core-shell structure, wherein the core contain at least one crosslinked vinylaromatic polymer, and the shell is elastomeric.

10 Claims, No Drawings

THERMOPLASTIC MOLDING COMPOSITION HAVING IMPROVED DIMENSIONAL STABILITY AND LOW GLOSS

The invention concerns a thermoplastic molding composition and more particularly a composition, which contains grafted rubber having a bimodal size distribution.

SUMMARY OF THE INVENTION

A thermoplastic molding composition which features improved dimensional stability and low gloss is disclosed. The composition which contains (A) a first grafted rubber having a weight average particle size of 0.05 to 0.30 microns, (B) a second grafted rubber having a weight average particle size of 0.31 to 1.00 microns, (C) vinyl chloride (co) polymer, and, optionally, (D) styrene copolymer is especially suitable for extruding profiles. In a preferred embodiment, at least one of the grafted rubbers is characterized in that its substrate features a core-shell structure, wherein the core contain at least one crosslinked vinylaromatic polymer, and the shell is elastomeric.

BACKGROUND OF THE INVENTION

It has long been known that thermoplastically processable styrene/acrylonitrile copolymers (SAN) may be imparted improved impact properties by the incorporation of rubbers. In ABS polymers, diene polymers are used as the rubbers for toughening, most notably at low temperatures; however, the relatively poor weathering and aging resistance make these materials less favored in more demanding applications. In some such applications, use has successfully been made of crosslinked acrylic acid ester polymers; these are the well-known ASA copolymers. Such copolymers have been described in U.S. Pat. No. 3,055,859 and in German Patents 1,260,135 and 1,911,882. Accordingly, the preferably crosslinked, rubbery acrylic acid ester polymer which serves as the grafting base (substrate) is first prepared by emulsion polymerization and the latex thus prepared is then grafted, preferably by emulsion, with a mixture of styrene and acrylonitrile. The art thus has long-recognized that improved impact strength, notched Izod and greater hardness are associated with ASA products which have, as a grafting base, a polyacrylate latex having a mean particle diameter of about 150 to 800 nm and a narrow particle size distribution. Also, noted is U.S. Pat. No. 4,224,419 which disclosed an ASA based composition that contains two different graft copolymers of SAN onto crosslinked acrylates, and a hard copolymeric SAN component. U.S. Pat. No. 5,157,076 is noted for its disclosure of a thermoplastic elastomer having improved abrasion resistance, the composition containing a (co)polymer of vinyl chloride and ASA as an impact modifier.

The art refers to "hard" and "soft" segments in terms of the relative position of their glass transition temperature vis a vis room temperature. "Hard" means $T_g$ above room temperature and "soft" means below room temperature. Multi-phase structured emulsion copolymers, including hard-soft and hard morphologies have been disclosed in EP 534,212 and in the documents referenced therein. Accordingly, graft copolymers having a hard core of polystyrene, a first butyl acrylate shell and an outer SAN shell are known. Significantly, the '212 document disclosed a monomodal system containing particles having a styrene core and measuring less than 0.2 microns. Also presently relevant is U.S. Pat. No. 5,932,655 that disclosed grafted rubbers having core/shell structures, the rubbers having bimodal size distribution, of the present invention.

DETAILED DESCRIPTION OF THE INVENTION

The inventive thermoplastic composition comprises:
(A) a first grafted rubber having a weight average particle size of 0.05 to 0.30, preferably 0.10 to 0.25 microns, and
(B) a second grafted rubber having a weight average particle size of 0.31 to 1.00, preferably 0.32 to 0.60 microns, and
(C) a (co)polymer of vinyl chloride, and optionally
(D) a styrene copolymer, wherein rubber content is 15 to 25, preferably 17 to 23 percent relative to the total weight of (A), (B), (C) and (D).

Preferably the total amount of (A) and (B) is about 25 to 50 percent, the amount of (C) is about 25 to 75 percent and (D) may be present in a positive amount of up to 20 percent, the percents being relative to the total of A, B, C and D. Components A and B may be present at a weight ratio of 9/1 to 1/9 therebetween.

The grafted rubber, in both component (A) and (B), contains a grafted phase and a substrate, the weight ratio therebetween preferably ranges from 0.3 to 1, preferably 0.5 to 0.9. In the preferred embodiments, the substrate of at least one of (A) and (B) has a core-shell structure. The grafted phase contains a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate. The weight ratio between said monomer(s) of said first group to said monomer(s) of said second group ranges between 80:20 to about 65:35.

The substrate of (A) and/or (B) comprises the crosslinked polymerization product of at least one member selected from the group consisting of $C_{2-8}$-alkyl acrylate, vinyl acetate, hydrogenated diene and diene. In a preferred embodiment, the substrate comprises a core/shell structure in at least one of (A) and (B). In these embodiments, the substrate contains about 2 to 40, preferably 5 to 30% relative to the weight of the substrate, of a core containing at least one, preferably crosslinked, vinylaromatic polymer, and about 60 to 98, preferably 70 to 95% relative to the weight of the substrate, of a shell containing the crosslinked polymerization product of at least one member selected from the group consisting of $C_{2-8}$-alkyl acrylate, vinyl acetate, hydrogenated diene and diene.

The (co)polymer of vinyl chloride, component (C) includes polyvinyl chloride homopolymer and vinyl chloride copolymers of at least one of: esters of vinyl alcohol containing 1 to 20 carbon atoms in the acid portion used to make the ester such as vinyl stearate, vinyl epoxystearate, vinyl benzoate, and vinyl acetate; acrylates and methacrylates containing 1 to 20, preferably 2 to 10 carbon atoms in the alcohol group that is used to make the ester such as ethyl acrylate, butyl acrylate, 2-ethylhexyl acrylate; acrylonitrile, methacrylonitrile, and derivatives thereof; esters of unsaturated dicarboxylic acids such as maleates, fumarates, and itaconates; carbon monoxide; olefins containing 2 to 20, preferably 2 to 6 carbon atoms such as ethylene, propylene and isobutylene; diolefins containing 4 to 20, preferably 4 to 8 carbon atoms such as butadiene, isoprene and halogen derivatives thereof such as chloroprene; alkyl vinyl ethers such as vinyl isobutyl ether and cetyl vinyl ether; vinyl aromatics containing 8 to 30, preferably 8 to 16 carbon atoms such as styrene, alpha-methyl styrene, and halogenated derivatives thereof such as para-chlorostyrene; vinyl organometallics such as monovinyldiethyl tin laurate, trialkyl tin acrylate and methacrylate, trialkylvinyl tin, unsaturated trihydrocarbon phosphate esters, vinyl phosphonic acid, N-chloroph-thalimide, poly-N-allyl substituted aminotriazine, N-substituted maleimide, vinyl pyridine, vinyl imidazole; alkenyl halides such as vinylidene chloride, vinyl bromide and fluoride, halogenated propenes, vinylidenechloro-fluoride, dichloroethylene; allyl clycidyl ether; allyl esters of hydroxy-alkanoic acids; dimethyl dicrotonate; chloroalydene; isopropenyl chloride; tetrafluoroethylene; norbornene acrylate; (cyanoethoxy) ethyl acrylate; and isopropenyl acetate.

PVC resins useful in the practice of this invention include copolymers of vinyl chloride containing up to 90 and preferably up to 70, and especially 30 to 60 weight percent of copolymerizable monomers. Methods for preparing the PVC polymers are also well known and such resins are widely available commercially in a variety of molding and extrusion grades.

The optional styrene copolymer, component (D) contains a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate. The weight ratio between said monomer(s) of said first group to said monomer(s) of said second group ranges from 80:20 to about 65:35.

The grafted rubbers, components (A) and (B) of the inventive composition, may be prepared by graft copolymerization of at least one of styrene, α-methyl styrene, ring halogenated styrene, ring-alkylated styrene, such as p-methylstyrene and tert.butylstyrene with at least one of (meth)acrylonitrile and methylmethacrylate in the presence of the substrate. Since 100% grafting yield cannot be achieved in the graft copolymerization, the polymerization product from the graft copolymerization always contains a proportion of free, non-grafted copolymer (for convenience, the grafted phase is referred to hereinafter in this text as SAN). However, for the purposes of the present invention, the term "grafted rubber" is only applied to the rubber to which SAN have actually been grafted. The proportion of the grafted SAN in the polymerization product from the graft copolymerization can be determined in the conventional manner by extracting the free, non-grafted SAN copolymer from the polymerization product, for example by methyl ethyl ketone. The principles of the method of separation have been described by Moore, Moyer and Frazer, Appl. Polymer Symposia No. 7, page 67 et seq. (1968).

The degree of grafting, in the present context, refers to the percentage proportion, based on the total graft rubber, of the SAN, which is chemically bonded in the grafting branches of the graft copolymer. The degree of grafting may be calculated from the analytically determined composition of the gel, which is insoluble in methyl ethyl ketone.

The particle size according to the invention is the weight-average particle size as determined by an ultracentrifuge, such as in accordance with the method of W. Scholtan and H. Lange, Kolloid-Z. und Z.-Polymere 250 (1972), 782–796. The ultracentrifuge measurement gives the integral mass distribution of the particle diameters of a sample. From this, it is possible to determine that the percentage by weight of the particles have a diameter equal to or less than a certain size.

The graft rubber useful according to the invention, namely component (A) and (B), may be prepared in the conventional manner by methods that are well known in the art. The preferably crosslinked core, which is present in at least one of (A) and (B) of the preferred embodiments, may be prepared by conventional emulsion techniques which are well known in the art. The monomers to be employed are at least one member selected from the group consisting of styrene, α-methyl styrene, ring-halogenated styrene and ring-alkylated styrene, such as p-methylstyrene and tert.butylstyrene. Crosslinking may be attained by the incorporation of small amounts, usually about 0.5 to 10%, preferably 0.5 to 3%, relative to the weight of the core, of any of the polyfunctional monomeric cross-linking agents, which are well known in the art, Examples include tri allyl cyanurate, di allyl maleate and di vinyl benzene.

The substrate or the shell in the relevant embodiments that entail substrate having core/shell structures, in components (A) and (B) contains the crosslinked polymerization product of at least one member selected from the group consisting of $C_{2-8}$-alkyl acrylate, vinyl acetate, hydrogenated diene and diene.

In the relevant preferred embodiment, the shell contains an acrylic acid ester polymer having a glass transition temperature of below 0° C. Preferably, this temperature should be below –20° C., more particularly below –30° C. The glass transition temperature of the polymer making up the shell may be determined by the DC method (K. H. Illers, Makromol. Chemie 127 (1969), page 1). Suitable alkyl acrylates for the preparation of acrylic acid ester polymers are those where the alkyl has 2 to 8 carbon atoms, most preferably those where the alkyl has 4 to 8 carbon atoms. Specific examples are n-butyl acrylate and ethylhexyl acrylate. The acrylic acid esters may be employed as individual compounds or as mixtures with one another. In the preparation of the core-shell phases, the monomers making up the shell are polymerized in the presence of the previously prepared core polymer.

In order to obtain crosslinking of the preferred acrylic polymers, the polymerization is preferably carried out in the presence of from 0.5 to 10% by weight, preferably from 0.5 to 3% by weight, based on the total monomers employed for the preparation of the grafting bases, of a copolymerizable, polyfunctional, preferably trifunctional, monomer which effects crosslinking and subsequent grafting. Suitable bifunctional or polyfunctional crosslinking monomers are those which contain two or more, preferably three, ethylenic double bonds which are capable of copolymerization and are not conjugated in the 1,3-positions. Examples of suitable crosslinking monomers are divinylbenzene, diallyl maleate, diallyl fumarate and diallyl phthalate, triallyl cyanurate and triallyl isocyanurate. Grafting agents may optionally be included, including unsaturated monomers having epoxy, hydroxy, carboxyl, amino or acid anhydride groups, for example, hydroxyalkyl (meth)acrylates.

The preparation of the preferred core/shell-structured grafted rubbers, (A) and/or (B), to be employed according to the preferred embodiment of invention, may be carried out in accordance with the following method. The preferably crosslinked vinyl aromatic core is first prepared by polymerizing the vinyl aromatic monomer(s) in aqueous emulsion by conventional methods at from 20 to 100° C., preferably from 50 to 90° C. The conventional emulsifiers, for example, alkali metal salts of alkyl sulfonic acids or alkyl aryl sulfonic acids, alkyl sulfates, fatty alcohol sulfonates, salts of higher fatty acids of 10 to 30 carbon atoms, or rosin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the core polymer. In general, a water:monomer ratio of from 50:1 to 0.7:1 is used. The polymerization initiators used are, in particular, the conventional persulfates, e.g., potassium persulfate, but redox systems can also be employed. In general, the initiator is used in an amount of from 0.1 to 1% by weight, based on the monomer(s) employed in the preparation of the core. Further polymerization additives which may be employed are the conventional buffers, to bring the pH to about 6 to 9, for example, sodium bicarbonate and sodium pyrophosphate, and from 0 to 3% by weight of a molecular weight regulator, for example, a mercaptan, terpinol, or dimeric $\alpha$-methyl styrene.

The precise polymerization conditions, such as the nature, rate of addition, and amount of the emulsifier initiator, and other additives, are selected, within the ranges referred to above, so that the resulting latex of the preferably crosslinked vinyl aromatic core polymer attains the indicated particle size. The particle size distribution of the particles making up the core in each of (A) and in (B) is monomodal. In the inventive composition, the particles of (A) and (B) conform to a bimodal size distribution.

The crosslinked elastomeric substrate, that in the preferred embodiments form the shell of (A) and/or (B) is preferably prepared by polymerizing at least one member selected from the group consisting of $C_{2-8}$-alkyl acrylates and butadienes in the known emulsion polymerization process. In the formation of a core/shell substrate, this polymerization is carried out in the presence of the previously prepared core latex as described above. In the relevant embodiments, the elastomeric shell amounts to about 60 to 98, preferably 70 to 95 percent relative to the total weight of the core-shell phase. A conventional aqueous emulsion polymerization process at temperatures of about 20 to 100° C., preferably 50 to 90° C., may be used and may be a continuation of the polymerization of the aromatic core, or, in the alternative, may be carried out separately. Added emulsifiers, initiators, buffers and molecular weight regulators useful in the preparation of the core may be used in the stated amounts in the process for the preparation of the shell. The crosslinking agents used in the making of the core are, in the above stated amounts, useful in preparing the crosslinked shell. Examples of such crosslinking agents are compounds having more than one non-conjugated double bond, such as, tri-allyl cyanurate, di-allyl maleate, di-vinyl benzene, ethylene glycol di-(meth)acrylate and butylene glycol di-methacrylate. Typically, these are used in amounts of about 0.1 to 10%, preferably 0.5 to 3%, relative to the weight of the monomers used to prepare the elastomeric substrate or shell.

To prepare the grafted phases of the components (A) and (B), a monomer system containing at least one monomer selected from a first group consisting of styrene, $\alpha$-methyl styrene, ring-alkylated styrene, such as, p-methylstyrene and tert.butylstyrene, with at least one monomer selected from a second group consisting of (meth)acrylonitrile and methylmethacrylate (herein "SAN"), is polymerized in the presence of the latex of crosslinked rubber, preferably, acrylic acid ester polymer which in the preferred embodiments contains about 1 to 25 percent relative to its weight of a polymer of vinyl aromatic monomer, preferably, styrene (core). The weight ratio between the monomer of said first group to said monomer of said second group is 80:20 to about 65:35.

It is advantageous if this graft copolymerization of the grafted phase onto the crosslinked rubber substrate is carried out in aqueous emulsion under the conventional conditions. The graft copolymerization may advantageously be carried out in the same system as the emulsion polymerization, which is used to prepare the substrate, optionally with the further addition of emulsifier and initiator. The monomer system to be grafted onto the base, can be added to the reaction mixture all at once, in several stages or, preferably, continuously during the polymerization. The graft copolymerization of the mixture onto the crosslinked rubber substrate is conducted such that a degree of grafting of 10, to 50% by weight, preferably 20 to 40% by weight, in the grafted rubbers (A) and (B), results. Since the grafting yield of the graft copolymerization is not 100%, it is necessary to employ a somewhat larger amount of the monomer mixture for the graft copolymerization than would correspond to the desired degree of grafting. The control of the grafting yield of the graft copolymerization, and, hence, the degree of grafting of the finished grafted rubbers (A) and (B), is familiar to the art-skilled and is effected, inter alia, by the rate of addition of the monomers and by adding a molecular chain regulator (Chauvel and Daniel, ACS Polymer Preprints 15 (1974), 329 et seq.). The emulsion graft copolymerization, in general, produces about 10 to 25% by weight, based on the graft rubber, of free, non-grafted copolymer. The proportion of the grafted rubber in the polymerization product obtained from the graft copolymerization is determined in accordance with the method specified above.

The grafted phase in the grafted rubbers (A) and (B), along with the non-grafted (free) polymer produced in the emulsion polymerization, is recovered as dry solids from the liquid latex by the usual coagulation, washing, dewatering and drying techniques.

As discussed above, the composition, in accordance with the invention, contains as Component (D) a styrene copolymer which includes a copolymer of at least one monomer selected from a first group consisting of styrene, $\alpha$-methyl styrene, ring-halogenated styrene and ring-alkylated styrene and at least one monomer selected from a second group consisting of (meth)acrylonitrile, and methyl methacrylate. The weight ratio between said monomer(s) of said first group to said monomer(s) of said second group is 80:20 to about 65:35. The free, non-grafted copolymer formed during the graft copolymerization for the preparation of the components (A) and (B), may also form part of the hard component (D). Depending on the conditions selected for the graft copolymerization to prepare the grafted rubber component (A) and (B), it is practically inevitable that a proportion of component (D) has already been formed during the graft copolymerization. In general, however, it is permissible to mix the products obtained from the graft copolymerization with additional, separately prepared component (D).

This additional, separately prepared, optional component (D) is preferably a styrene/acrylonitrile copolymer, an $\alpha$-methyl styrene/-acrylonitrile copolymer or a $\alpha$-methyl styrene/styrene/acrylonitrile terpolymer. These copolymers can be employed individually, or as mixtures with one another, as component (D), so that the additional separately prepared hard component (D) of the composition, according to the invention, can be, for example, a mixture of a styrene/acrylonitrile copolymer and a $\alpha$-methyl styrene/acrylonitrile copolymer. Component (D) may be obtained by conventional methods. Thus, the copolymerization of styrene and/or $\alpha$-methyl styrene with acrylonitrile can be carried out by radical polymerization preferably mass polymerization, solution polymerization, suspension polymerization or aqueous emulsion polymerization.

The mixing of the components for the preparation of the inventive composition may be carried out conventionally by method and equipment well known in the art.

The composition may contain, as further components, any additive conventionally used for their art recognized utility in thermoplastic molding compositions, such as fillers, other compatible plastics, plasticizers, mold release agents, antistatic agents, antioxidants, lubricants, dyes, pigments, flame retarding agents, hydrolysis stabilizers and UV absorbers. The additives may be used in conventional effective amounts, preferably of from 0.1 to a total of about 30% relative to the total weight of A+B+C+D.

The examples, which follow, illustrate the invention. In the examples, parts and percentages are by weight, unless stated otherwise.

EXAMPLES

Experimental

Compositions representative of the invention have been prepared and their properties determined. The results of the determinations are shown in the table below. In the preparation of the compositions, the individual components used in the examples were as follows:

ASA -1: ASA rubber having a monomodal size distribution and a weight average particle size of 0.14 microns comprising a butyl acrylate substrate and a grafted SAN phase. The content of acrylonitrile (AN) in the grafted SAN was 30% relative to the weight of the grafted phase.

ASA -2: ASA rubber having a bimodal size distribution having a corresponding weight average particle sizes of 0.175 microns (small mode) and 0.375 microns (large mode).

The small mode comprises a grafted core-shell; the content of AN in the grafted S/AN was 22.5% relative to the weight of the grafted phase. The amount of styrenic core was 25% and the butyl acrylate rubber in the core-shell structure amounted to 75% of the weight of the substrate.

The large mode comprises a grafted core-shell; the content of AN in the grafted S/AN was 20% relative to the weight of the grafted phase. The amount of styrenic core was 5% and the butyl acrylate rubber in the core-shell structure amounted to 95% of the weight of the substrate.

ASA-2 contained 50% of the small mode and 50% of the large mode, the percents being relative to the weight of ASA-2.

SAN: a styrene-acrylonitrile copolymer having acrylonitrile content of 32% relative to the weight of the copolymer.

PVC: polyvinyl chloride resin.

All compositions contained conventional additives for their art-recognized utility, believed to have no criticality in the present context.

| Example | 1 | 2 | 3 | 4 |
|---|---|---|---|---|
| ASA-1 | 30 | 37.5 | 45 | — |
| ASA-2 | — | — | — | 37.5 |
| SAN | 20 | 12.5 | 5 | 12.5 |
| Pvc | 50 | 50 | 50 | 50 |
| Properties | | | | |
| Gloss, 75° | 40 | 33 | 20 | 17 |
| Bowing (inches) | 0.4 | 0.7 | 1.7 | 0.4 |

Gloss values were determined in accordance with ASTM D 523 using a Gardner Glossmeter at 75 degrees incident angle. The degree of bowing, an indication of dimensional stability is determined by placing a length of extruded profile on a flat surface. Bowing was measured as the distance between the flat surface and the profile at the extreme width of the profile. If the profile remains in contact with the flat surface at the extreme width of the profile, the bowing is zero.

The data (Compare Examples 2 to 4) show that the reduced gloss and improved dimensional stability is a characteristic of the inventive composition and that these advantageous characteristics are not shared by a corresponding composition that is identical in all respects except for the monomodal size distribution of its component.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of
   (A) a first grafted rubber having a weight average particle size of 0.05 to 0.30 microns,
   (B) a second grafted rubber having a weight average particle size of 0.31 to 1.00 microns,
   (C) (co)polymer of vinyl chloride, and, optionally,
   (D) styrene copolymer,
wherein total rubber content is 15 to 25 percent relative to the total weight of (A), (B) and (C) and (D) and wherein said grafted rubber, both occurrences, contains a grafted phase and a substrate, and wherein said grafted phase contains a copolymer of at least one monomer selected from a first group consisting of styrene, α-methyl styrene, ring-halogenated styrene and ring-alkylated styrene and at least one monomer selected from a second group consisting of (meth)acrylonitrile, wherein weight ratio between said monomer of said first group and said monomer of said second group is about 80:20 to about 65:35 and wherein the substrate comprises the crosslinked polymerization product of at least one member selected from the group consisting of $C_{2-8}$-alkyl acrylate, vinyl acetate, hydrogenated diene and diene, said styrene copolymer (D) containing a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate where weight ratio between said monomer of said first group to said monomer of said second group ranges from 80:20 to about 65:35.

2. The thermoplastic molding composition of claim 1 wherein the particle size of said (A) is 0.10 to 0.25 microns.

3. The thermoplastic molding composition of claim 1 wherein the particle size of said (B) is 0.32 to 0.60 microns.

4. The thermoplastic molding composition of claim 1 wherein the rubber content is 17 to 23 percent.

5. The thermoplastic molding composition of claim 1 wherein the total amount of (A) and (B) is about 25 to 50 percent relative to the total weight of A+B+C+D.

6. The thermoplastic molding composition of claim 1 wherein the amount of (C) is about 25 to 75 percent relative to the total weight of A+B+C+D.

7. The thermoplastic molding composition of claim 1 wherein said (A) and (B) are present in the composition at weight ratio of 9/1 to 1/9 therebetween.

8. The thermoplastic molding composition of claim 1 wherein the weight ratio between the grafted phase and substrate is 0.3/1 to 1/1.

9. A thermoplastic molding composition consisting essentially of
   (A) a first grafted rubber having a weight average particle size of 0.05 to 0.30 microns,
   (B) a second grafted rubber having a weight average particle size of 0.31 to 1.00 microns,
   (C) (co)polymer of vinyl chloride, and, optionally,
   (D) styrene copolymer,
wherein total rubber content is 15 to 25 percent relative to the total weight of (A), (B) and (C) and (D) and wherein said grafted rubber, both occurrences, contains a grafted phase and a substrate, and wherein said grafted phase contains a copolymer of at least one monomer selected from a first group consisting of styrene, α-methyl styrene, ring-halogenated styrene and ring-alkylated styrene and at least one monomer selected from a second group consisting of (meth)acrylonitrile, wherein weight ratio between said monomer of said first group and said monomer of said second group is about 80:20 to about 65:35 and wherein the substrate comprises the crosslinked polymerization product of at least one member selected from the group consisting of $C_{2-8}$-alkyl acrylate, vinyl acetate, hydrogenated diene and diene, said styrene copolymer (D) containing a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate where weight ratio between said monomer of said first group to said monomer of said second group ranges from 80:20 to about 65:35 with the proviso that the substrate of at least one of said (A) and (B) comprise a core/shell structure.

10. The thermoplastic molding composition of claim 9 wherein the structure comprises (a) about 2 to 40% of a core containing at least one vinylaromatic polymer, and (b) about 60 to 98% of a shell containing the crosslinked polymerization product of at least one member selected from the group consisting of $C_{2-8}$-alkyl acrylate, vinyl acetate, hydrogenated diene and diene, said percent being relative to the weight of said structure.

\* \* \* \* \*